United States Patent [19]

Young

[11] Patent Number: 4,545,209
[45] Date of Patent: Oct. 8, 1985

[54] CRYOGENIC REFRIGERATION SYSTEM WITH LINEAR DRIVE MOTORS

[75] Inventor: Niels O. Young, Free Union, Va.

[73] Assignee: Helix Technology Corporation, Waltham, Mass.

[21] Appl. No.: 458,718

[22] Filed: Jan. 17, 1983

[51] Int. Cl.$^4$ ............................................. F25B 9/00
[52] U.S. Cl. .......................................... 62/6; 60/520;
308/10; 310/12; 310/15; 318/135; 417/417
[58] Field of Search ................ 62/6; 60/520; 310/12;
310/15; 318/135; 308/10; 417/417

[56] References Cited

U.S. PATENT DOCUMENTS

| | | | |
|---|---|---|---|
| 3,423,948 | 1/1969 | Cowans | 62/6 |
| 4,044,567 | 8/1970 | Dix et al. | 62/6 |
| 4,306,419 | 12/1981 | Schwartz | 62/6 |

*Primary Examiner*—Ronald C. Capossela
*Attorney, Agent, or Firm*—Hamilton, Brook, Smith & Reynolds

[57] ABSTRACT

In a cryogenic split Stirling refrigerator, the compressor and displacer are driven by linear drive motors. Each compressor linear drive motor has a plurality of radial permanent magnets 44, 46 mounted to each compressor piston 22, 24. A tapered collet 56 expands an expanding sleeve 42 against the magnets and compresses a sleeve 38 against the piston. A housing 34 hermetically seals the gas about the armature and supports the coil assembly 76, 78. The displacer drive motor includes an axial permanent magnet 202 mounted to the displacer drive piston 192. It is surrounded by a housing 210 which hermetically seals the spring volume surrounding the magnet. The drive coils 216, 218 are supported on that housing. The coils are surrounded by flux returns 222, 224 which can be adjusted to minimize radial forces on the drive piston.

14 Claims, 10 Drawing Figures

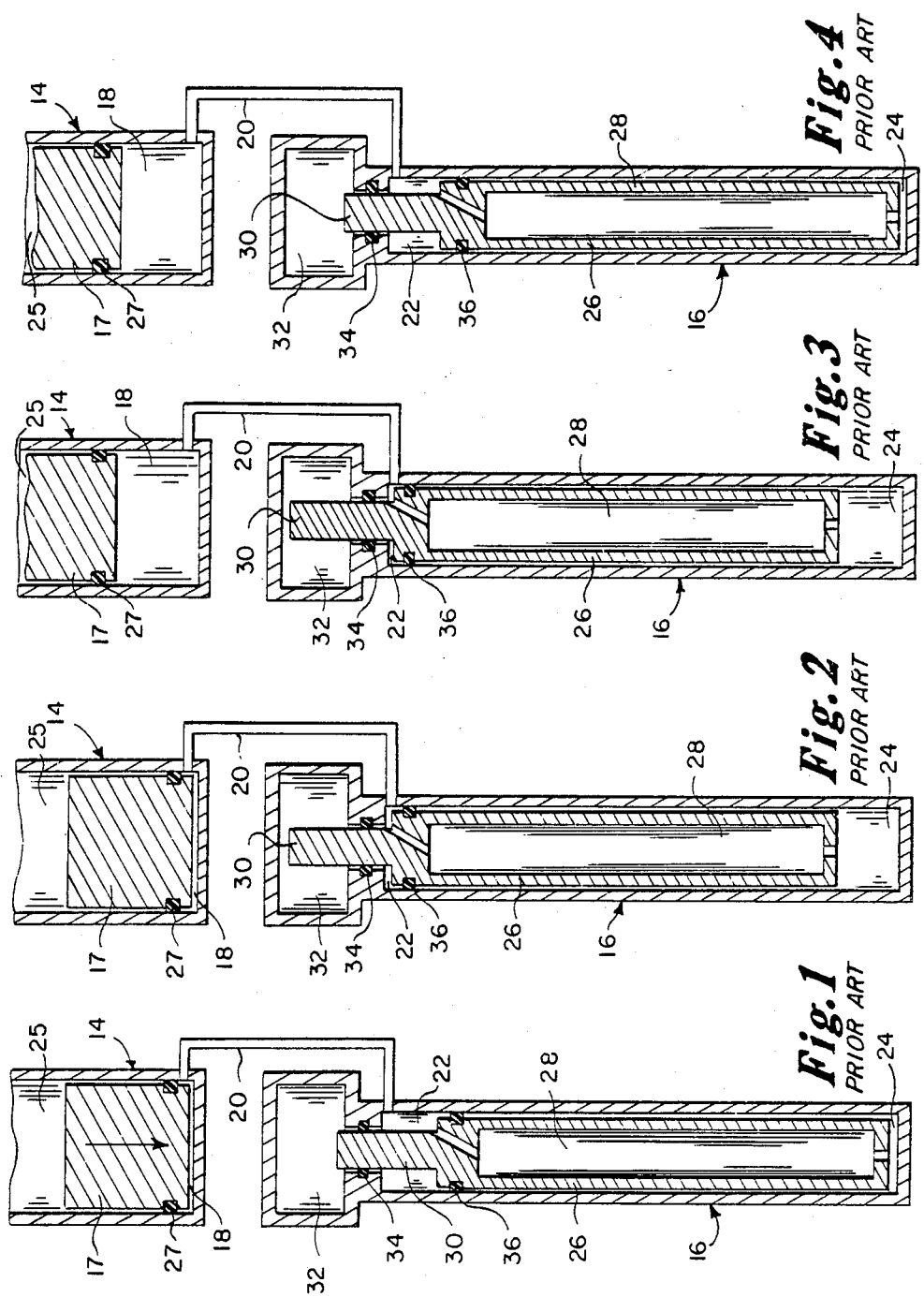

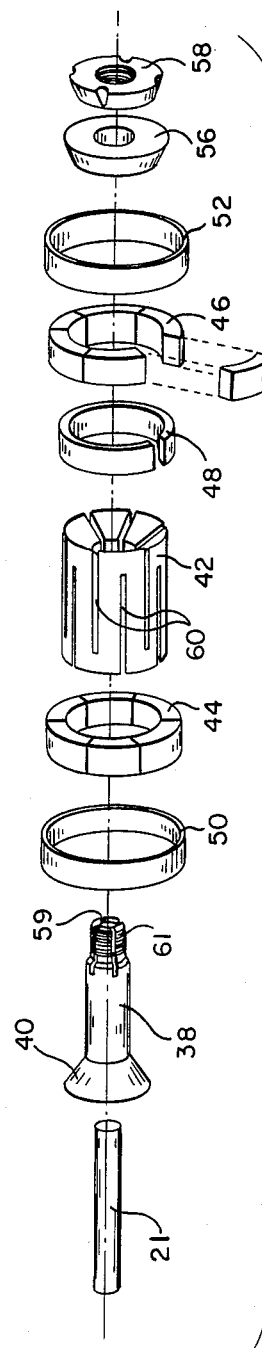
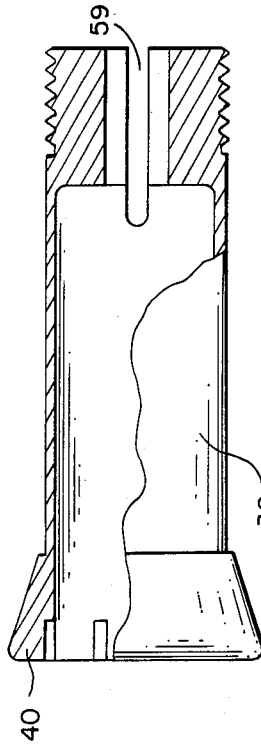
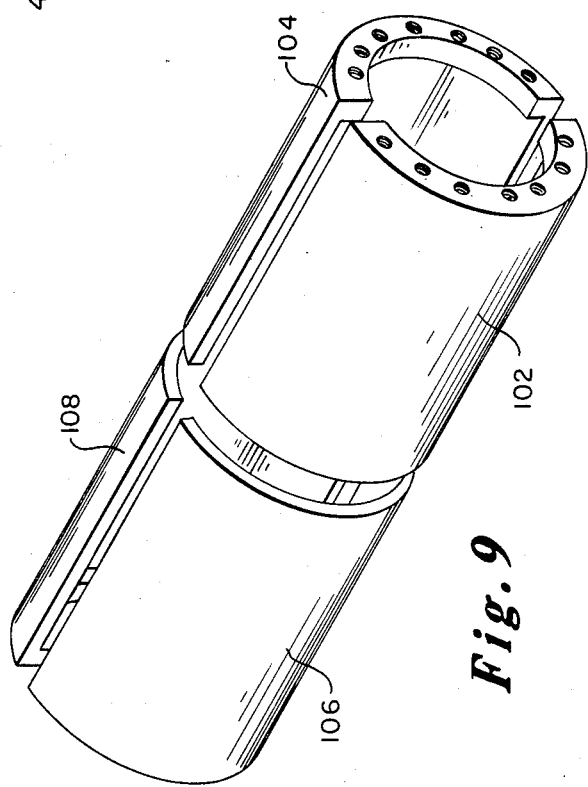

4,545,209

CRYOGENIC REFRIGERATION SYSTEM WITH LINEAR DRIVE MOTORS

DESCRIPTION

1. Field of the Invention

This invention relates to cryogenic refrigeration systems such as split Stirling cryogenic refrigerators. In particular it relates to such systems having displacers and/or compressors driven by linear motors.

2. Background

A conventional split Stirling refrigeration system is shown in FIGS. 1–4. This system includes a reciprocating compressor 14 and a cold finger 16. The piston 17 of the compressor provides a nearly sinusoidal pressure variation in a pressurized refrigeration gas such as helium. The pressure variation in a head space 18 is transmitted through a supply line 20 to the cold finger 16.

The usual split Stirling system includes an electric motor driven compressor. A modification of that system is the split Vuilleumier. In that system a thermal compressor is used. This invention is applicable to both of those refrigerators as well as to others such as Gifford-McMahon refrigerators.

Within the housing of the cold finger 16 a cylindrical displacer 26 is free to move in a reciprocating motion to change the volumes of a warm space 22 and a cold space 24 within the cold finger. The displacer 26 contains a regenerative heat exchanger 28 comprised of several hundred fine-mesh metal screen discs stacked to form a cylindrical matrix. Other regenerators, such as those with stacked balls, are also known. Helium is free to flow through the regenerator between the warm space 22 and the cold space 24. As will be discussed below, a piston element 30 extends upwardly from the main body of the displacer 26 into a gas spring volume 32 at the warm end of the cold finger.

The refrigeration system of FIGS. 1–4 can be seen as including three isolated volumes of pressurized gas. A working volume of gas comprises the gas in the space 18 at the end of the compressor, the gas in the supply line 20, and the gas in the spaces 22 and 24 and in the regenerator 28 of the cold finger 16. A second volume is a relatively large dead space in the compressor including the space 25 behind the compressor piston 17. It is sealed from the working volume by the piston seal 27. The third volume of gas is the gas spring volume 32 which is sealed from the working volume by a piston seal 34 surrounding the drive piston 30.

Operation of the conventional split Stirling refrigeration system will now be described. At the point in the cycle shown in FIG. 1, the displacer 26 is at the cold end of the cold finger 16 and the compressor is compressing the gas in the working volume. This compressing movement of the compressor piston 17 causes the pressure in the working volume to rise from a minimum pressure to a maximum pressure and this warms the working volume of gas. The pressure in the gas spring volume 32 is stabilized at a level between the minimum and maximum pressure levels of the working volume. Thus, at some point the increasing pressure in the working volume creates a sufficient pressure difference across the drive piston 30 to overcome retarding forces, including a pressure differential across the displacer and the friction of displacer seal 36 and drive seal 34. The displacer then moves rapidly upward to the position of FIG. 2. With this movement of the displacer, high-pressure working gas at about ambient temperature is forced through the regenerator 28 into the cold space 24. The regenerator absorbs heat from the flowing pressurized gas and thereby reduces the temperature of the gas.

With the sinusoidal drive from a crank shaft mechanism, the compressor piston 17 now begins to expand the working volume as shown in FIG. 3. With expansion, the high pressure helium in the cold space 24 is cooled even further. It is this cooling in the cold space 24 which provides the refrigeration for maintaining a temperature gradient of over 200 degrees Kelvin over the length of the regenerator.

At some point in the expanding movement of the piston 17, the pressure in the working volume drops sufficiently below that in the gas spring volume 32 for the gas pressure differential across the piston portion 30 to overcome retarding forces such as seal friction. The displacer 26 is then driven downward to the position of FIG. 4, which is also the starting position of FIG. 1. The cooled gas in the cold space 24 is thus driven through the regenerator to extract heat from the regenerator.

It has been understood that the phase relationship between the working volume pressure and the displacer movement is dependent upon the braking force of the seals on the displacer. If those seals provided very low friction, it had been understood that the displacer would move from the lower position of FIG. 1 to the upper position of FIG. 2 soon after the working volume pressure increased past the pressure in the spring volume 32. Because the spring volume is at a pressure about midway between the minimum and the maximum values of the working volume pressure, movement of the displacer would take place during the midstroke of the compressor piston 17. This would result in compression of a substantial amount of gas in the cold end 24 of the cold finger, and because compression of gas warms that gas this would be an undesirable result.

To increase the efficiency of the system, upward movement of the displacer is retarded until the compressor piston 17 is near the end of a stroke as shown in FIGS. 1 and 2. In that way, substantially all of the gas is compressed and thus warmed in the warm end 22 of the cold finger, and that warmed gas is then merely displaced through the regenerator 28 as the displacer moves upward. Thus, the gas then contained in the large volume 24 at the cold end is as cold as possible before expansion for further cooling of that gas. Similarly, it is preferred that as much gas as possible be expanded in the cold end of the cold finger prior to being displaced by the displacer 26 to the warm end. Again, the movement of the displacer must be retarded relative to the pressure changes in the working volume.

In prior systems, the seals 34 and 36 are designed and fabricated to provide an amount of loading to the displacer to retard the displacer movement by an optimum amount. A major problem of split Stirling systems is that with wear of the seals the braking action of those seals varies. As the braking action becomes less the displacer movement is advanced in phase and the efficiency of the refrigerator is decreased. Also, braking action can be dependent on the direction of the pressure differential across the seal.

In addition to the problem of wear of the seals, the refrigerator is often subjected to different environments. For example, a refrigerator may be stored at extremely high temperature and be called on to provide efficient cyogenic refrigeration. On the other hand, the refrigerator may be subject to very cold environments. The sealing action and friction of the seals is generally very dependent on temperature.

Due to the problems associated with synchronizing the regenerator movement with the pressure waves from the compressor, efforts have been made to utilize linear drive motors rather than the pneumatic drive discussed above. An example of such a system can be found in U.S. Pat. No. 3,991,586 to Acord. That system also utilizes clearance seals and thus avoids the problems associated with wear of conventional seals. The problem associated with such a linear motor system is that the linear drive motor is bulky and heavy and generates heat at the cold finger portion of the refrigerator. In a split Stirling refrigerator, it is often critical that the cold finger portion of the refrigerator be minimized in size and weight and that little heat be generated in that portion of the system. It is for those reasons that the pneumatic displacer drive has been so widely used in split Stirling systems.

The Acord patent shows a rotary compressor which is typically used in split Stirling refrigerators. Recent efforts have been made to use linear compressors in such refrigeration systems because the low number of parts in such systems make linear motors very cost effective.

DISCLOSURE OF THE INVENTION

This invention relates to several improvements in linear drive motors which can be utilized in either a compressor or a displacer drive. A primary improvement is that the motor includes a permanent magnet mounted to the moving armature of the motor which in turn drives a piston element. The permanent magnet is surrounded by a stationary housing which supports one or more drive coils. This structure allows for a compact, clean assembly in which the gas refrigerant is not exposed to organic materials on the drive coil. Further, the moving magnet arrangement allows for minimization of radial forces on the armature without unduly reducing the efficiency of the motor. Minimization of radial forces is particularly important where gas lubricated clearance seals provide the only mechanical support for the armature as in the present design.

In further improvements of the linear motors of the present design, the magnetic flux paths may be adjusted to assure that the magnetic axis and mechanical center of the armature and the magnetic axis of the surrounding coils are the same. In one adjustment, a flux return is generally cylindrical and is split along its length into two elements. The relative angular positions of the two elements can be adjusted about the center of the flux return path in order to adjust the magnetic axis of the path. In the embodiments disclosed, that split flux return path surrounds the drive coils of the stator. The magnetic axis of the armature can be adjusted by adjusting the angular positions of a number of permanent magnets on the armature. By adjusting the armature magnets and the stator flux return paths together, the two magnetic axes of each can be brought into collinearity with the mechanical axis of the armature.

In order to avoid contamination of the gas refrigerant, an object of the present design has been to avoid the use of organic materials, such as epoxy, in any of the working volume, compressor dead space, and cold end spring volume. To that end, in one motor, a permanent magnet assembly is joined to the armature by an expansion element. Specifically, a number of radial permanent magnetics are positioned about an expansible sleeve and retained on that sleeve by an outer retainer ring. The sleeve is expanded by a tapered collet which also presses inward against a sleeve which grips the driven piston element. In another drive motor, an axial magnet is retained on the driven piston element by a screw threaded connector, specifically a threaded flux return path.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 1-4 illustrate operation of a conventional pnuematically driven split Stirling refrigerator;

FIG. 6 is an exploded view of the armature assembly in the compressor of FIG. 5;

FIG. 7 is a side view, primarily in section, of the tapered sleeve in FIG. 6;

FIG. 9 is a perspective view of an alternative embodiment of the outer, flux return casing of the compressor of FIG. 5;

DESCRIPTION OF PREFERRED EMBODIMENTS

Figure 5:
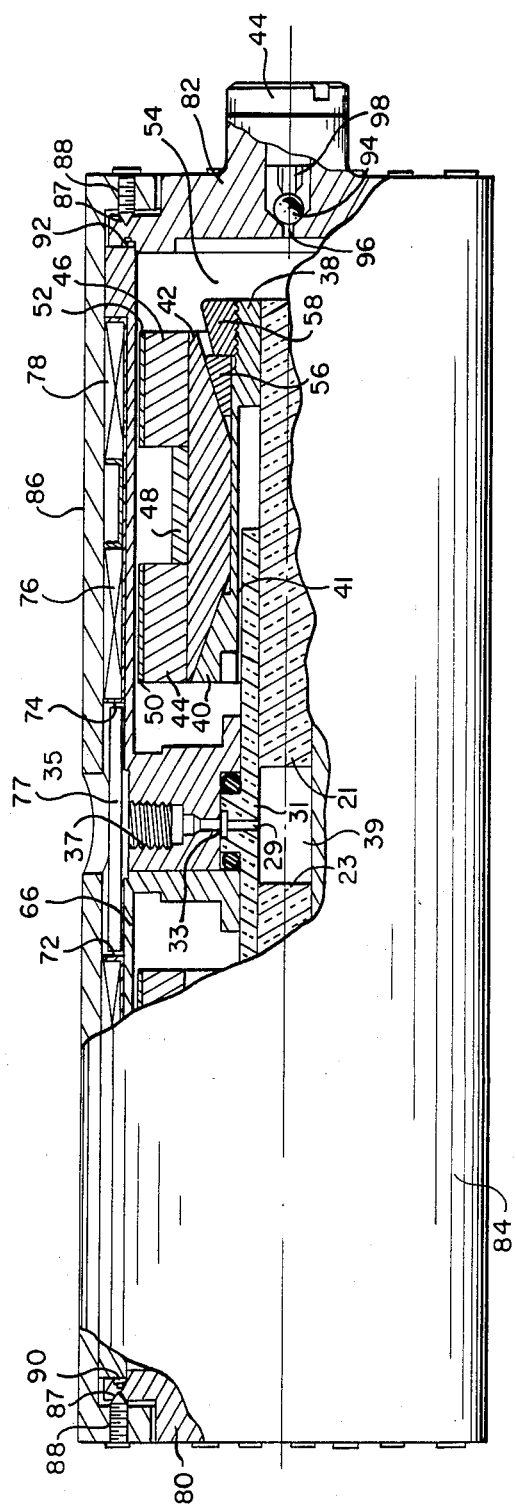
FIG. 5 is a side view of a compressor in a split Stirling refrigerator embodying this invention partially in section to show the linear motor assembly.

The preferred compressor design is illustrated in FIG. 5. This compressor comprises dual reciprocating piston elements 21 and 23 which, when driven toward each other, compress helium gas in the head space 39. The gas can pass through a side port 29 in a compression chamber cylinder 31 to an outer annulus 33 in that cylinder. The gas from the annulus 33 can pass through an outer housing 35 to a tube fitting hole 37. A tube (not shown) joined at the fitting hole 37 delivers the gas to a cold end section of the split Stirling refrigerator. Preferably, the pistons 21 and 23 and the compression chamber cylinder 31 are of cermet, ceramic or other hard, low friction material. The elements are close fitting to provide clearance seal therebetween.

The pistons 21 and 23 serve as the sole mechanical support for respective armatures of linear drive motors. Identical motors drive the two pistons. The right hand motor is shown in FIG. 5 and is described below with reference to FIGS. 5 through 8.

A sleeve 38 (FIGS. 6 and 7) is joined to the piston 21 at its far end from the compressor head space 39. The sleeve 38 has an inner clearance 41 such that it is free to shuttle back and forth along the compression chamber cylinder 31 without contacting that cylinder. The sleeve 38 has a tapered flange 40 at its left end. An expanding sleeve 42, placed on the sleeve 38 from the right, abuts the flange 40. The expanding sleeve 42 is also an inner flux return and should have a high magnetic permeability. It supports two sets of radial permanent magnets 44, 46 spaced by a spacer 48. The six magnets in each set of permanent magnets are retained by magnet retainer rings 50 and 52.

Although the magnets 44 and 46 are shown closely packed in FIG. 6, they are preferably dimensioned such that, when placed about the expanding sleeve 42, spaces remain between the magnets. With that arrangement, helium gas in the dead space 54 of the compressor is free to flow between the magnets as the drive motor armature and compressor piston assembly shuttles back and forth. Further, dissimilarities in the magnet elements might cause the magnetic axis of the grouped magnets to be offset from the mechanical center of the piston 21. The magnetic axis can be made the same as the mechanical center by adjusting the relative angular positions of the magnets about the expanding sleeve 42. Such an offset of the magnetic axis from the mechanical center would result in radial forces on the piston 21 which would tend to bind the piston within the cylinder 31. The elimination of radial forces is particularly important in this compressor design where the sole mechanical support for the armature is the piston 21 within the cylinder 30.

As shown in FIG. 6, the expanding sleeve 42 has slots 60 formed therein to allow for expansion. To fix the permanent magnets 44 and 46 in position on the armature, a tapered collet 56 is wedged between the expanding sleeve 42 and the tapered sleeve 38 by a nut 58. As the nut 58 is tightened on the sleeve 38, the expanding sleeve is pressed outward by the tapered flange 40 and the collet 56. The expanding sleeve in turn presses the permanent magnets 44 and 46 against the magnet retainer rings 50 and 52.

The tapered sleeve 38 has two slots 59 and 61 formed in the end thereof so that, as the collet 56 presses outward against the expanding sleeve 42, it also presses inward and compresses the sleeve 38 to form a tight joint between the sleeve and the piston 21. The use of the expansion and compression joints in the armature avoids the need for any epoxy or other adhesive which might contaminate the helium gas.

Figure 8:
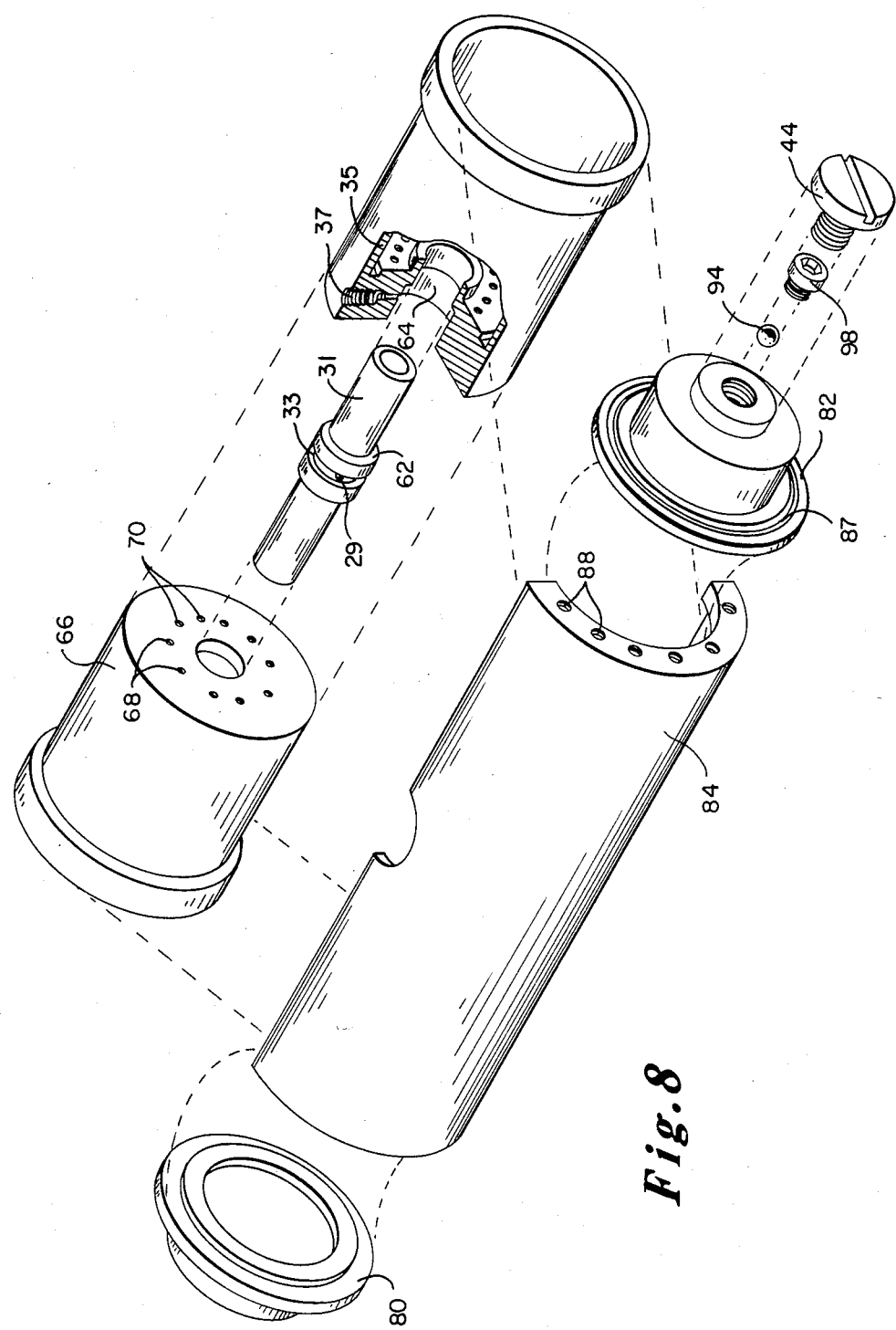
FIG. 8 is an exploded view of the primary stationary parts, other than the drive coil assembly, in the compressor of FIG. 5.

The armature assembly just described is enclosed and hermetically sealed within the housing 35 best shown in the exploded view of FIG. 8. The central raised portion 62 of the compression chamber cylinder 31 is retained within an annulus 64 of the housing 35 when that housing is joined end to end with a left hand housing 66. Each of the housings is provided with a number of bolt holes 68 through which bolts extend to join the housings. The housings also have a number of gas port holes 70 through which helium gas flows in the dead space behind the two pistons elements 21 and 23. Before the housings 35 and 66 are assembled, coil supporting bobbins 72 and 74 (FIG. 5) are fitted over the housings. Bobbin 74, for example, supports two coils 76 and 78 and Hall effect position sensors (not shown) between the two coils. The bobbins are spaced apart by a spacer 77. The spacer 77 is a ring which surrounds the two housings 35, 66 and is split to permit the tube fitting to be connected to the fitting hole 37.

The compressor assembly is completed by positioning end covers 80 and 82 at the ends of the housings 66 and 35 to close the helium gas space, and by positioning half sleeves 84 (FIG. 8) and 86 (FIG. 5) over those end covers and the coil assemblies. Set screws through the holes 88 in the cover sleeves 84 and 86 are seated in grooves 87 and press the end caps 80 and 82 tightly against indium seals 90 and 92 (FIG. 5) and the housings 66 and 34.

The end cap 82 includes an assembly which allows for charging of the housing with helium gas. Specifically, a ball 94 closes a port 96 in the end cover 82. The ball is retained against the port by a retainer screw 98 and is protected from contamination by a plug 44.

The outer cover sleeves 84 and 86 serve to both enclose the coil assemblies and hold the end covers in place. Further, they are of ferromagnetic material and serve as flux return paths for the coils.

Because the half sleeves 84, 86 do not completely surround the compressor assembly, they may be shifted angularly relative to each other about the coils to adjust the flux paths and thus adjust the magnetic axis of the coil assembly. Such adjustment of the flux return paths can be used to particular advantage in the embodiment of FIG. 9 wherein a separate set of outer covers is positioned over each linear motor of the compressor. Specifically, outer flux return covers 102 and 104 surround the right hand assembly, and covers 106 and 108 surround the left hand assembly. For each motor assembly, by adjusting the armature magnets and the flux return sleeves, the magnetic axes of the armature and coil assemblies can both be collinear with the mechanical axis of the armature assembly. The outer flux returns of FIG. 9 load the end covers 80 and 82 in a similar fashion as in FIG. 5, and the tension would be absorbed by a modification to spacer 77.

It can be noted that the coils are positioned entirely outside of the helium gas environment. With that arrangement, there is no danger of contamination of the helium gas by the potting material along the coils. Further, no electrical feedthroughs into the helium environment are required. With all coils outside of the helium enclosing housing, a compact, easily constructed assembly is provided and heat generated in the coils is most easily removed from the system.

The use of permanent magnets in the linear motors reduces the power requirements of the motors. By positioning those permanent magnets on the armature, rather than on the stator with the coils, a larger gap between the ferromagnetic material of the armature and the ferromagnetic material of the stator can be provided while retaining reasonable efficiency. Such a wide gap reduces the radial forces on the armature which might tend to bind the piston assembly within the compression chamber cylinder or cause excessive wear of those parts.

Figure 10:
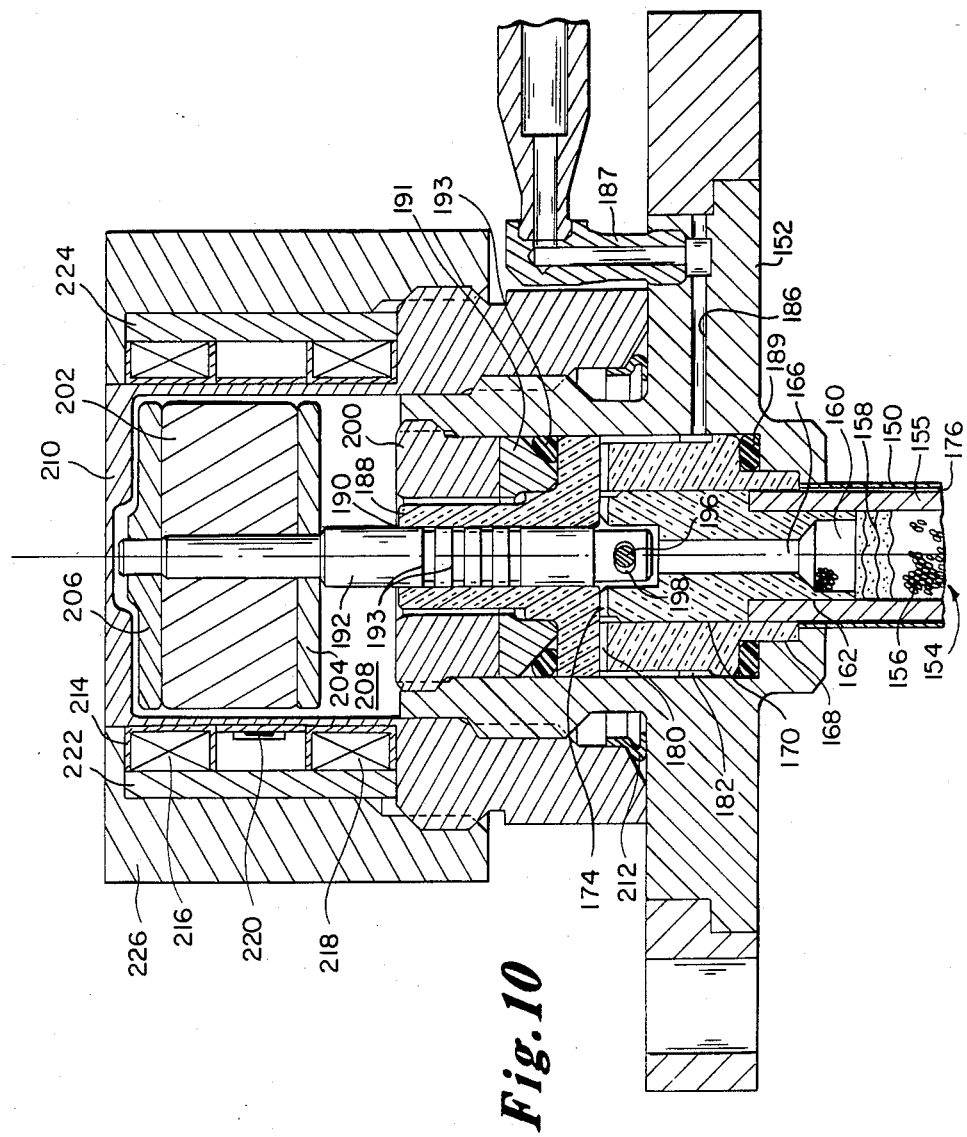
FIG. 10 is an elevational, cross sectional view of the displacer drive motor of a split Stirling refrigerator embodying this invention.

The cold end displacer drive of the split Stirling refrigerator is shown in FIG. 10. The cold end includes an outer cylindrical casing 150 fixed to and suspended from a cold finger head 152. The opposite, cold end of the cylinder 150 is not shown. A displacer 154, mounted for reciprocating movement within the cylinder 150, includes a fiberglass epoxy cylinder 155. The cylinder 155 may be packed with nickel balls 156 sandwiched between short stacks of screen 158 at each end of the regenerator. The screen is held in place by a porous plug 160. The porous plug 160 is positioned at the end of a bore 166 in a cermet clearance seal element 162.

The cermet clearance seal element 162 is fixed to the cylinder 155. It is seated within a second cermet clearance seal element 168 to provide a clearance seal 170. The clearance seal 170 is preferably a 0.00015 inch (0.0038 millimeter) radial gap between the two cermet clearance seal elements. The gap is half the diametrical clearance between the clearance seal elements. That clearance seal allows for virtually dragless movement of the element 162 within the element 168 while providing sealing between the warm end 174 of the cold finger working volume and an annulus 176 between the cold finger cylinder 150 and the displacer cylinder 155. The sealing action of the clearance seal is due to the small radial gap extending axially along the approximately 0.25 inch (6 millimeter) length of the seal.

Channels 180 are formed in the top of the clearance seal element 168 to provide fluid communication between the warm end 174 of the displacer and an annulus 182. The annulus 182 is connected to the compressor of FIG. 5 through a port 186 and fitting 187.

Another outer clearance seal element 188 is positioned within the cold finger head 152. This element is also formed of cermet. The clearance seal element 188 has a smaller inner diameter than the lower clearance seal element 168. The element 188 forms a clearance seal 190 with a cermet drive piston 192. The cermet piston 192 and the cermet clearance seal element 188 are of nonmagnetic material, preferably cermet. Grooves 193 are provided in the cermet piston element 192 to minimize diametral pressure force differentials which might otherwise cause side forces which tend to bind the displacer.

The clearance seal element 188 is clamped against the seal element 168, which in turn is pressed against a seal 189 and the cold finger head 152, by a clamping nut 200. The nut 200 is screw threaded with the head 152 and acts on the element 188 through a tapered washer 191 and seal ring 193.

The piston 192 reciprocates with the main body of the displacer, and in fact the pressure differential across the drive piston serves to drive the entire displacer. The piston 192 is joined to the cermet element 162 by means of a pin 196 extending through a transverse slot 198 at the lower end of the piston 192. This joint allows radial accomodation no greater than 0.005 inch to occur between piston 192 and clearance seal element 162. By this means, the concentricity and alignment tolerances between clearance seals 190 and 170 may be relaxed.

A samarium cobalt magnet 202, sandwiched between flux return plates 204 and 206, is mounted to the drive piston 192. The magnet 202 is an axially polarized magnet which by the action of the plates 204 and 206 yields a radial magnetic flux. Because the outer diameter of the motor assembly is about ten times the stroke of this motor there is sufficient support space for this construction. But in the compressor design of FIGS. 5-9 the outer diameter is only about three times the stroke, and radially megnets were required. The flux return plate 206 serves as the magnet connector by means of its threaded connection to the end of the piston 192. An expanding connector as used in the compressor could be used in this motor as well, but the annular axial magnet allows for this simpler connection. As before, however, no adhesive is required.

A gas spring volume 208, in which the armature assembly reciprocates, is formed by a housing 210 which is screw threaded onto the cold finger head 152 against a metal spring seal 212. A bobbin 214, which supports two coils 216 and 218 and a Hall effect position sensor 220, is positioned over the housing 210. Flux returns 222 and 224, in the form of half sleeves as in the compressor motor, are positioned around the coils 216 and 218. During assembly, these flux return half sleeves can be positioned against the coils and their angular positions relative to each other can be adjusted to assure that the magnetic axis of the flux returns is the same as that of the armature. This is done by adjusting the flux return relative angles while observing the drive current through the coils on an oscilloscope. A minimum current indicates a minimum of friction force.

Once the flux returns 222 and 224 are properly positioned and secured by an adhesive, they are enclosed by an outer housing 226 which is joined to the spring volume housing 210 by a screw connection.

The linear motor of FIG. 10 is for the purpose of trimming the motion of the displacer to assure that the displacer makes full strokes without rapping the ends of the cold finger and that it moves in proper phase with the pressure wave. A patent application filed Dec. 6, 1982 in the names of Niels O. Young, Robert Henderson and Peter J. Kerney discloses feedback and control circuitry designed for that purpose.

While the invention has been particularly shown and described with reference to preferred embodiments thereof, it will be understood by those skilled in the art that various changes in form and details may be made therein without departing from the spirit and scope of the invention as defined by the appended claims.

I claim:

1. A cryogenic refrigerator comprising a gaseous working fluid which is alternatively compressed and expanded to cool a portion of the working fluid to cryogenic temperatures and a linear drive motor for driving a piston element in the refrigerator which acts on the working fluid in a thermodynamic refrigeration cycle, the linear drive motor comprising:
   a permanent magnet armature fixed to the piston element;
   a housing surrounding the permanent magnet armature and hermetically sealing the volume in which the armature reciprocates; and
   a coil assembly surrounding the housing.

2. A cryogenic refrigerator as claimed in claim 1 further comprising means for adjusting the magnetic axis of either or both of the moving or fixed parts of the linear drive motor to minimize radial forces on the driven piston element.

3. A cryogenic refrigerator as claimed in claim 1 further comprising a generally cylindrical outer flux path surrounding the coil assembly and formed of sections, the angular positions of which can be adjusted.

4. A cryogenic refrigerator as claimed in claim 1 wherein the driven piston has a close tolerance relative to a surrounding cylinder to form a clearance seal and the piston element within the surrounding cylinder is the sole mechanical support of the armature.

5. A cryogenic refrigerator as claimed in claim 1 wherein the permanent magnet is an axial magnet joined by a screw threaded connector to the piston element.

6. A cryogenic refrigerator as claimed in claim 5 wherein the screw threaded connector is a flux return plate.

7. A cryogenic refrigerator comprising a gaseous working fluid which is alternately compressed and expanded to cool a portion of the working fluid to cryogenic temperature and a linear drive motor for driving, along a piston axis, a piston element in the refrigerator which acts on the working fluid in a thermodynamic refrigeration cycle, the linear drive motor comprising:
   a plurality of circumferentially spaced segments of a flux path encircling the piston axis to form an annular portion of the flux path by which the linear motor drives the piston, the spaced segments being mounted for adjusting the relative circumferential positions of the segments and fixing the relative circumferential positions of the segments during operation of the linear drive motor for adjusting a magnetic center of the linear drive motor so that the center matches the mechanical center of the piston element.

8. A cryogenic refrigerator as claimed in claim 7 further comprising a generally cylindrical outer flux return surrounding a motor coil assembly and formed of sections, the angular positions of which can be adjusted.

9. A cryogenic refrigerator comprising a gaseous working fluid which is alternately compressed and expanded to cool a portion of the working fluid to cryogenic temperatures and a linear drive motor for driving a piston element in the refrigerator which acts on the working fluid in a thermodynamic refrigeration cycle, the linear drive motor armature comprising:
a screw threaded extension of the piston element extending into a volume within a motor stator;
an annular, axially magnetized magnet surrounding and supported by the piston extension; and
a screw threaded connector fixed to the end of the piston extension by a screw threaded coupling to retain the magnet on the piston extension.

10. A cryogenic refrigerator as claimed in claim 9 wherein the screw threaded connector is a flux return plate.

11. A cryogenic refrigerator having a gas displacer which reciprocates in a housing to displace gas in a working volume of gas through a regenerator and a linear drive motor for driving the the displacer in a thermodynamic refrigeration cycle, the linear drive motor comprising:
an axial permanent magnet mounted to a drive piston of the displacer;
a housing hermetically sealing a spring volume of gas about the axial magnet; and
a drive coil assembly surrounding the housing.

12. A cryogenic refrigerator as claimed in claim 11 further comprising a generally cylindrical outer flux return surrounding the coil assembly and formed of sections, the angular positions of which can be adjusted.

13. A cryogenic refrigerator as claimed in claim 11 wherein the permanent magnet is joined by a screw threaded connector to the piston element.

14. A cryogenic refrigerator as claimed in claim 13 wherein the screw threaded connector is a flux return plate.

* * * * *